United States Patent [19]

Yoshio

[11] Patent Number: 4,477,893
[45] Date of Patent: Oct. 16, 1984

[54] TONE ARM DEVICE

[75] Inventor: Junichi Yoshio, Saitama, Japan

[73] Assignee: Pioneer Electronic Corporation, Tokyo, Japan

[21] Appl. No.: 411,382

[22] Filed: Aug. 25, 1982

Related U.S. Application Data

[63] Continuation of Ser. No. 173,249, Jul. 29, 1980, abandoned.

[30] Foreign Application Priority Data

Jul. 30, 1979 [JP] Japan .................................. 54-97932

[51] Int. Cl.³ .............................................. G11B 3/10
[52] U.S. Cl. ........................................ 369/244; 369/56
[58] Field of Search ..................... 369/33, 41, 56, 224, 369/244

[56] References Cited

U.S. PATENT DOCUMENTS 2,587,970  3/1952  Courtis et al. ...................... 369/56
4,171,817 10/1979  Iyeta .............................. 369/230 X Primary Examiner—Charles E. Phillips
Attorney, Agent, or Firm—Sughrue, Mion, Zinn, Macpeak and Seas

[57] ABSTRACT

A tone arm device for a turntable in which the tone arm is mounted upon an inner movable member rotatably supported on an outer movable member freely rotatable with respect thereto. The rotational position of the inner movable member and hence the tone arm is detected as is the rotational position of the outer movable member. Control means operates in response to the signals representing the rotational positions of the inner and outer movable members to produce a control signal which is used to drive a magnetic actuator which causes the outer movable member to rotate so as to track the rotational position of the inner movable member.

8 Claims, 6 Drawing Figures

TONE ARM DEVICE

This is a continuation of application Ser. No. 173,249, filed July 29, 1980, now abandoned.

BACKGROUND OF THE INVENTION

The present invention relates to an automatically movable pick-up tone arm for a phonograph turntable. More particularly, it relates to a tone arm for which good tracking conditions are maintained during playing and for which simultaneous detection of the rotational speed of the player turntable and angular position of the tone arm is made.

In a prior art player capable of automatically detecting the angular position of the tone arm as in an automatic record changer, attachments such as a position sensor and a drive magnet have been provided on a rotary shaft of the tone arm to sense the angle of horizontal rotation thereof. However, it is undesirable that such attachements be used because they add weight to and hence increase the inertia of the tone arm. Also, it is necessary to provide an automatic record changer tone arm with a resonance point in a predetermined frequency range taking into account the effects of the elements attached to the tone arm. Contact-type position sensors such as a slide resistor have previously been used to perform the position detecting function. However, the influence of the frictional loss inherent in such a device upon the reproduction sensitivity is not negligible. Therefore, such a sensor has not been found suitable in actual use.

In view of the above-noted defects, an object of the present invention is to provide a highly sensitive tone arm for turntable, specifically an automatic record changer type turntable, which is capable of automatic movement and of accurately detecting the angular position of the tone arm.

SUMMARY OF THE INVENTION

This, as well as other objects of the invention, are met by a tone arm device for a record turntable including a tone arm tube having means for receiving a stylus at one end thereof, a first support means for rotatably supporting the tone arm tube, a second means for rotatably supporting the first support means, and means for rotatably positioning the second support means to track the rotational movement of the first support means. Preferably, the positioning means includes optical detecting means for detecting the rotational position of the first support means, slide resistor means for detecting the rotational position of the second support means, a servo controller operating in response to output of the optical detecting and slide resistor means, and magnetic driving means for rotating the second support means in response to an output of the servo controller.

Further in accordance with the invention, there is provided a tone arm device for a record turntable including a tone arm tube having means for receiving a stylus at one end thereof, an inner movable member rotatably supporting the tone arm, an outer movable member freely rotatable relative to the inner member, supporting means for rotatably supporting the outer movable member, first detecting means for detecting a position of the inner movable member, control means for producing a drive signal in response to an output signal of the first detecting means, and drive means for driving the outer movable member to track the movement of the inner movable member in accordance with the drive signal produced by the control means. In one embodiment, the inner and outer movable members are individually rotatable. Preferably, the outer movable member has an inner bore in which the inner movable member is rotatably disposed through bearing means. The second detecting means for detecting the position of the outer movable member can be provided with the control means operating to compare an output signal of the second detecting means with the output signal of the first detecting means to position the outer movable member in response thereto. The first detecting means may include means for optically detecting the variations in movement of the inner movable member. This may be a light emitting element mounted upon the outer movable member and a light receiving element mounted upon the inner movable member.

DESCRIPTION OF THE PREFERRED EMBODIMENTS

Figure 1:
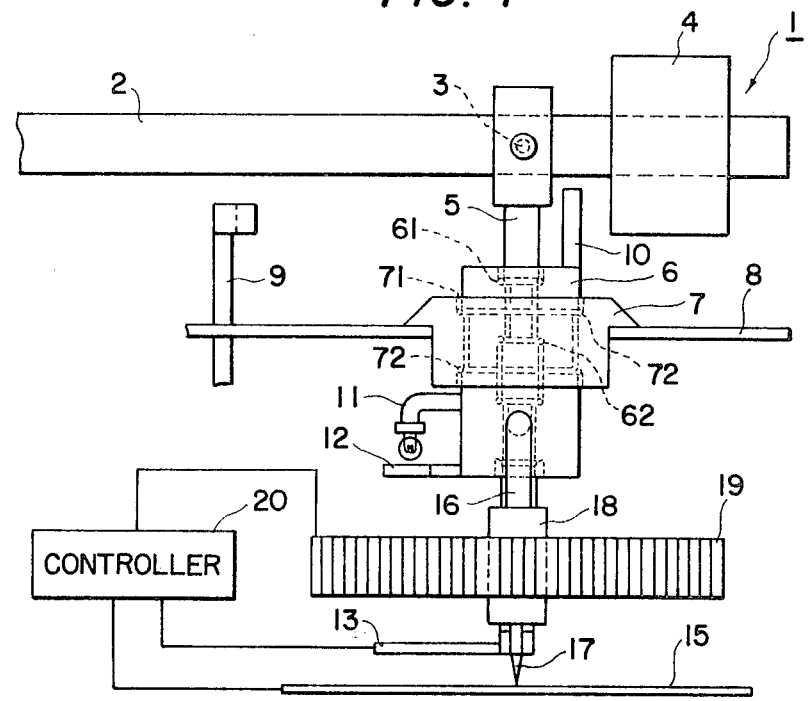
FIG. 1 is a side view of a tone arm device according to the present invention.
Figure 2:
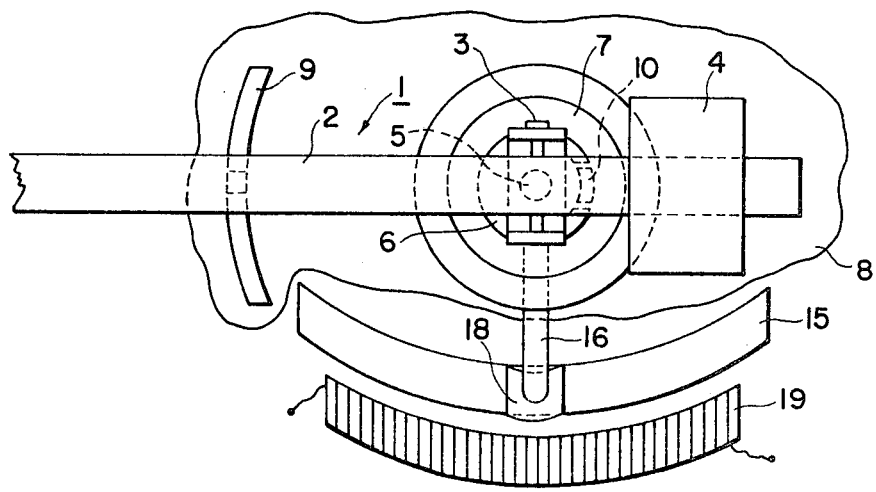
FIG. 2 is a plan view of the tone arm device shown in FIG. 1.
Figure 3A:
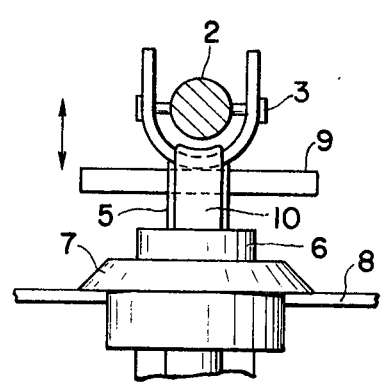
FIGS. 3A to C are illustrations for explaining operations of the tone arm shown in FIGS. 1 and 2.
Figure 3B:
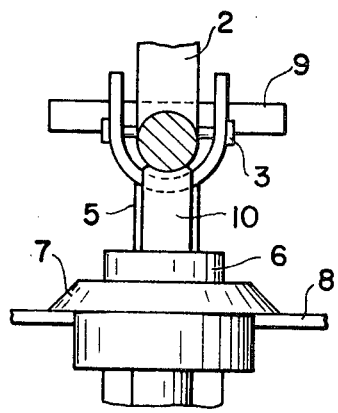
Figure 3C:
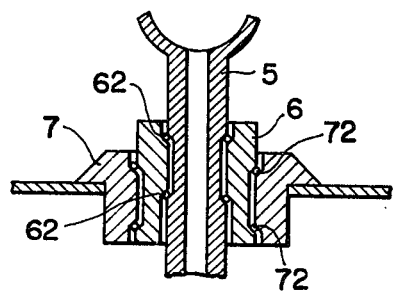

Referring to FIGS. 1 to 3, a preferred embodiment of a tone arm constructed according to the present invention will be described in detail. In FIG. 1 showing a side view of tone arm 1, reference numeral 2 denotes an arm tube, 3 a horizontal rotary shaft, 4 a balance weight, 5 an inner vertical rotary shaft, 6 an outer vertical rotary shaft co-acting with the inner vertical rotary shaft 5, 7 a bearing member for the outer vertical rotary shaft, and 8 a base plate. The vertical rotary shaft 5 is rotatably supported in an insert bore 61 in the outer vertical shaft 6 by bearings 62. The inner vertical shaft 5 is horizontally rotatable but not movable in the vertical direction. The outer rotary shaft 6 is rotatably supported in an insert bore 71 in the bearing member 7 by bearings 72. The outer shaft 6 is horizontally rotatable but not movable in the vertical direction. Reference numeral 9 denotes an arm lifter. Element 10 is a support rod engageable with the arm tube 2. A photosensor including a light emitting lamp 11, a photosensor slit 12 and a light receiving element 13 is provided for detecting the rotational position of the vertical shaft 5. The lamp 11 and the slit 12 are mounted at suitable positions on the vertical rotary shaft 6. The light receiving element 13 is mounted on a lower end extension of the inner vertical rotary shaft 5. A slide resistor device composed of a slide resistor 15, a slide resistor support arm 16 extending from the outer vertical shaft 6 and a sliding contact 17 mounted on the end of the arm 16 is provided for detecting the rotational position of the outer vertical shaft 6. A drive device for the outer vertical rotary shaft 6 is made up of a magnet 18 mounted on the support arm 16 and a magnetic coil 19. The output signals from the photosensor (11, 12 and 13) and the slide resistor (15, 16 and 17) and the input signals for operating the drive device (18 and 19) are processed by an external control device 20 so that the rotational position of the outer vertical rotary shaft 6 tracks that of the inner rotary shaft 5. For this purpose, the external control device should be an electronic control device such as a servo controller which can be implemented with a microprocessor. The structure and operation of such servo controllers is well-known. With the described structure, because the frictional forces acting on the inner vertical rotary shaft 5 are greatly reduced because of the tracking movement of the outer vetical rotary shafts, the quality of reproduction is significantly improved.

The thus constructed pick-up arm system operates as follows. In the play state, when the vertical shaft 5 is rotated as the stylus tracks a groove of a phonograph record, the photosensor light receiving element 13 mounted on the vertical shaft 5 is also rotated. The amount of light received upon the light receiving element 13 from the lamp 11 through the slit 12 is varied in accordance with the rotational angle of the vertical shaft 5. Variations in the amount of light received are detected by the external control device. The control device controls a current flow through the coil 19 in accordance with the variations in the amount of light received in response to which the magnet 18 mounted on the support arm 16 is rotated and hence causing the outer vertical rotational shaft 6 to rotate. When a predetermined amount of light is received by the light receiving element 13, the outer vertical rotary shaft 6 is stopped. By repeating the above-described operations, the outer vertical rotary shaft 6 follows the rotation of the inner vertical rotary shaft 5. Because of this relationship, the rotational position of the tone arm is accurately detected through the slide resistor (15, 16 and 17) to thereby achieve operation such as the selection of music at predetermined positions on a record.

When the arm tube 2 is lifted by the arm lifter 9, the position shown in FIG. 3A is changed to that shown in FIG. 3B. That is, the arm tube 2 is horizontally rotated with the stylus end moved upward so that the rear portion of the arm tube 2 is engaged with the support rod 10. In this state, when the inner vertical rotary shaft 5 is rotated, the outer vertical rotary shaft 6 is also rotated due to the engagement with the support rod 10. This rotation may, of course, be manually implemented. However, it is possible to automatically carry out operations such as music selection and automatic return. In this case, the output of the slide resistor (15, 16 and 17) representing the rotational position of the tone arm is transmitted to the control device to thereby control the rotation of the tone arm 2 with the drive device (18 and 19).

Figure 4:
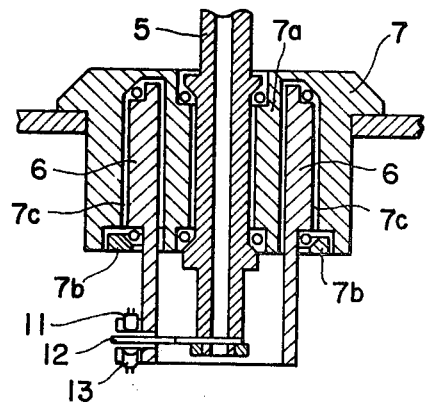
FIG. 4 is a cross-sectional view of a modification of the tone arm according to the present invention.

FIG. 4 shows another preferred embodiment of a tone arm constructed according to the present invention. In this embodiment, the bearing member 7 is provided with a dual wall construction. The inner vertical rotary shaft 5 is supported by an inner bearing wall while the outer vertical rotary shaft 6 is supported by an upper end portion of an annular groove 7c. With this construction, the rotational motions of the outer and inner vertical shafts are made further independent of one another. In particular, because the inner vertical shaft 5 is independently rotatable, the reproduction sensitivity is not inferior to that of a manual turntable as is often true of an automatic record changer. In this embodiment the slit 12 is mounted on the inner vertical rotary shaft 5. The lamp 11 and the light recovery element 13 are mounted on the vertical rotary shaft 1.

In the first described embodiment, the rod 10 is used as an engagement device. However, other engagement devices may, of course, be used. The slide resistor (15, 16 and 17) and the drive device (18 and 19) may be variously modified. Particularly, an optical pulse counter and a magnetic position sensor may be used as the angular position detector.

The pick-up arm mechanism according to the present invention is advantageous in actual use since no attachment for automatic operation and no angular position detecting means are used which would cause deterioration of the reproduction characteristics. The rotational position detector in the invention is separated from the vertical shaft during the playing of a record. For this reason, various modification thereto may be used.

In the specific embodiments described, the present invention has been applied to an offset type tone arm which is swingable. However, the invention may be applied as well to a linear moving type tone arm.

What is claimed is:

1. A tone arm device for a record turntable comprising:
    a tone arm tube having means for receiving a stylus at one end thereof;
    an inner moveable member rotatably supporting said tone arm tube for rotation about horizontal and vertical axes;
    an outer moveable member freely moveable relative to said inner member;
    supporting means for rotatably supporting said outer moveable member;
    first detecting means for detecting the position of said inner moveable member relative to said outer moveable member and providing a corresponding output signal;
    second detecting means for detecting the position of said outer moveable member and providing a corresponding output signal;
    control means operating to compare said output signal from said second detecting means with said output signal from said first detecting means for producing a drive signal;
    drive means for driving said outer moveable member to track movement of said inner moveable member in accordance with said drive signal produced by said control means;
    lifting means for rotating said tone arm tube about said horizontal axis to raise said one end of said tone arm tube and lower the opposite end thereof; and
    tone arm tube support means carried by said outer moveable member on the opposite side of said inner moveable member from said lifting means and having means for engaging said tone arm tube whereby upon rotation of said tone arm tube into engagement with said support means, manual rotation of said tone arm tube about said vertical axis in both directions will directly rotate said outer moveable member with said inner moveable member.

2. The tone arm device as defined in claim 1 wherein said inner and outer movable members are individually rotatable.

3. The tone arm device as defined in claim 2 wherein said outer movable member has an inner bore ans said inner movable member is rotatably disposed in said bore through bearing means.

4. The tone arm device as claimed in claim 1 wherein said second detecting means comprises variable resistor means.

5. The tone arm device as defined in claim 1 wherein said first detecting means comprises means for optically detecting variations in the movement of said inner movable member.

6. The tone arm device as defined in claim 5 wherein said detecting means comprises a light emitting element mounted on said outer movable member and a light receiving element mounted on said inner movable member.

7. The tone arm device as defined in claim 1 wherein said drive means comprises means for magnetically driving said outer movable member.

8. The tone arm device as defined in claim 1 wherein said outer and inner movable members are individually supported by a single supporting means through respective bearing means.

* * * * *